Patented Feb. 14, 1933

1,897,211

UNITED STATES PATENT OFFICE

JAMES P. PENNY, OF BUFFALO, NEW YORK, ASSIGNOR TO NATIONAL ANILINE AND CHEMICAL COMPANY, INC., OF NEW YORK, N. Y., A CORPORATION OF NEW YORK

PROCESS FOR PRODUCING AZO DYES

No Drawing.   Application filed May 19, 1930. Serial No. 453,876.

The present invention relates to improvements in the production of azo dyes, and more particularly to improvements in the process of coupling a diazonium compound with a naphthol sulfonic acid in the presence of an alkaline medium.

In coupling a diazotized aminoazoaryl compound with a naphthol sulfonic acid in the presence of soda ash to produce an azo dye, the quality and the yield of dye vary from batch to batch, depending on the quality of the intermediates and other conditions of coupling. In general, it is also necessary to provide an excess of naphthol sulfonic acid over the stoichiometric proportion required for the coupling to insure maximum yields of dye. However, even under the most favorable conditions of manufacture, the yields are not satisfactory, and there is a lack of uniformity in yields and quality of dye produced.

The present invention has for one of its objects to increase the yield and brightness of shade of dyestuff produced in coupling a diazotized aminoazoaryl compound with a naphthol sulfonic acid. Another object is to reduce the time required for completing the coupling and obtain uniform and increased yields of dye of good quality. Still another object is to reduce the quantity of the naphthol sulfonic acid component required to complete the coupling. A further object is to eliminate the deleterious effects of the presence of small amounts of impurities in the intermediates. These and other objects will be apparent from a consideration of the present disclosure.

According to the present invention, an aminoazoaryl compound which belongs to the class having the following general formula

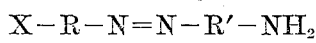

wherein R and R' represent substituted or unsubstituted like or unlike aryl residues of the benzene or naphthalene series, and X represents a hydrogen atom or an arylazo residue, is diazotized and the diazo compound is subsequently coupled in the presence of a heterocyclic tertiary nitrogenous base, preferably one which is soluble in water, with a naphthol sulfonic acid, preferably one which is free from an amino group but which may contain other substituents. Further the invention includes diazotizing an aminoazoaryl compound comprised within the following general formula

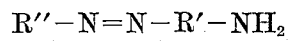

wherein R'' and R' represent substituted or unsubstituted like or unlike aryl residues of the benzene or naphthalene series, and coupling the diazotized compound in the presence of a heterocyclic tertiary nitrogenous base into a substituted or unsubstituted naphthol sulfonic acid. The invention further contemplates diazotizing an aminoarylazophenyl compound comprised within the following general formula

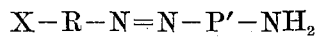

wherein P' represents a substituted or unsubstituted aryl residue of the benzene series, R represents a substituted or unsubstituted aryl residue of the benzene or naphthalene series, and X represents a hydrogen atom, or an arylazo residue, and particularly diazotizing an aminophenylazophenyl compound comprised within the following general formula

wherein P and P' represent substituted or unsubstituted like or unlike aryl residues of the benzene series, and X represents a hydrogen atom, or an arylazo residue, and coupling the diazotized compound in the presence of a heterocyclic tertiary nitrogenous base into a naphthol sulfonic acid which is free from an amino group but which may contain other substituents. More particularly, the invention comprises diazotizing aminoazobenzene or its homologues and substitution products, and coupling the diazotized compound in the presence of a heterocyclic tertiary nitrogeneous base into a naphthol sulfonic acid which is free from substituents other than the hydroxy and sulfonic groups. The coupling may be carried out in all cases in the presence or absence of acid binding agents.

The invention is illustrated by the following examples. The parts are by weight.

*Example 1.*—340 parts of the disodium salt of 2-naphthol-6.8-disulfonic acid (G-salt) are charged into 3150 parts water. 300 parts soda ash are added, and the mixture is agitated until the material is in solution. 4000 parts ice and 48 parts pyridine are added to the resulting solution which is agitated until the temperature is about 0° C. With the solution agitated and the temperature maintained at 0° C., a solution is added of the diazo compound which is produced by diazotizing 200 parts aminoazobenzene hydrochloride with sodium nitrite and hydrochloric acid in the customary manner. After the admixture has been agitated for several hours, it is heated to effect dissolution of the resulting dyestuff, a temperature of about 35° to 38° C. being required. The pyridine is eliminated by neutralizing the reacted mixture with hydrochloric acid till only a faint alkaline reaction is indicated, about 350 parts of 20° Bé. hydrochloric acid being required. The dye is then precipitated out of solution by adding about 900 parts salt and cooling the solution to about 25° C. The precipitated dyestuff is filtered and blown dry. The diazo dye is produced in better yields and is of brighter shade than the dyestuff produced when no pyridine is employed in the coupling.

*Example 2.*—A solution of 223 parts of 1.6-Cleve's acid and 400 parts of sodium acetate in 200 parts water is added to a diazo solution prepared by diazotizing in acid solution in the usual manner 180 parts of oxalyl-p-phenylenediamine with 69 parts sodium nitrite. When the coupling is completed, the azo compound oxalyl-p-aminophenyl-azo-6-sulfo-1-naphthylamine is diazotized in the usual manner with 69 parts sodium nitrite in the presence of 310 parts muriatic acid 20° Bé., and 2000 parts ice. When diazotization is completed, a solution of 223 parts of 1.6-Cleve's acid and 400 parts of sodium acetate in 2000 parts of water is added to the diazo solution. When the coupling is completed, the azo compound, oxalyl-p-aminophenyl-azo-6-sulfo-naphthalene-azo-6-sulfo-1-naphthylamine, is salted out with about 500 parts salt and filtered.

The press-cake is then added to 5000 parts water and is diazotized with 69 parts sodium nitrite in the presence of 3000 parts ice and 300 parts muriatic acid. 246 parts of Schaeffer acid (mono sodium salt) are dissolved in 4000 parts water, after which 350 parts soda ash and 45 parts technical pyridine are added to the Schaeffer salt solution. When diazotization is completed, the diazo solution is run into the solution of Schaeffer salt to effect the coupling. When the coupling is completed, the solution is heated to about 70° C. and about 500 parts common salt are added. The solution is then cooled to about 50° and the resulting precipitate of the trisazo dye is filtered off.

The oxalyl group then may be replaced by hydrogen by hydrolysis in any suitable manner, as by boiling with caustic soda, etc. The trisazo dye is produced in better yields, and is of brighter shade than the dyestuff produced when no pyridine is employed.

In the above examples the pyridine may be replaced by quinoline or any other suitable heterocyclic tertiary nitrogeneous base.

In the presence of pyridine, reaction between the diazotized aminoazobenzene and the coupling component takes place readily and rapidly. The coupling may take place in the presence of pyridine in the absence of any other acid binding agent, or a part of the pyridine may be replaced by an alkali, for example, soda ash. I prefer to employ about 0.7 mols of pyridine and about 3.1 mols of soda ash or other acid binding agent per mol of diazotized aminoazobenzene hydrochloride. Lesser proportions of pyridine may be employed, if desired, but the use of lesser quantities is apt to have a deleterious effect on the yield and quality of the color; and in general, is not recommended. The proportion of naphthol sulfonic acid in excess of the stoichiometric proportion may be varied through wide limits. The pyridine may be pure or of technical grade. It is not necessary to remove the pyridine from the finished color for most purposes. However, if desired, the pyridine can be mostly eliminated by conversion into a soluble salt with a mineral acid, and precipitating the dye from the combination in any suitable manner.

I am unable to definitely explain the function which the pyridine performs in the coupling reaction. It is known that when diazotized aminoazobenzene hydrochloride comes in contact with an acid binding agent, such as soda ash, in aqueous solution, it is converted to a form which combines only slowly and incompletely with coupling components. Pyridine and other tertiary organic nitrogeneous bases, apparently prevent the transformation of diazotized aminoazobenzene hydrochloride into the inactive form, possibly by a reaction between the base and the diazo compound.

It will be understood that the term arylazo residue, as used in the specification and claims, denotes a radical having an azo group attached to an aryl residue which in turn may or may not be bridged to one or more other aryl residues by means of one or more azo groups, and said aryl residues may or may not contain substituents, for example, $C_6H_5-N=N-$, $C_6H_5-N=N-C_6H_4-N=N-$, $NH_2.C_6H_4-N=N-$, $CH_3.C_6H_4-N=N-$, $HO_3S.C_{10}H_6-N=N-$, $HO_2C.CO.NH.C_6H_4.N=N-$, etc.

In the above example, the aminoazobenzene may be replaced by other aminoazoaryl compounds, for example: p-aminobenzene-azo-6- (or 7)-sulfonaphthalene-azo-6- (or 7)-sulfonaphthylamine, aminoazotoluene, aminoazoxylene, dimethylamino-benzeneazoaniline, benzeneazonaphthylamine, aminobenzeneazonaphthylamine, benzeneazo 6 (or 7)-sulfonaphthylamine, 2-hydroxy13.5-dinitrobenzeneazo-6 (or 7)-sulfonaphthylamine, sulfobenzeneazoaniline, sulfobenzene-azo-sulfoaniline, sulfo-o-toluene-azo-toluidine, aminoazoxylenedisulfonic acid, sulfobenzene-azo-naphthylamine, sulfobenzene-azo-anisidine, sulfobenzene-azo-aminocresol, sulfobenzene-azo-naphthylamine, disulfobenzene-azo-naphthylamine, 6-(or 7)-sulfo-4-aminoalphanaphthaleneazoaniline, 2-(or 3)-sulfo-p-toluene-azo-alpha-naphthylamine, 3-carboxy-4-hydroxybenzene-azo-alphanaphthylamine, 3-carboxy-4-hydroxybenzene-azo-6-(or 7), sulfoalphanaphthylamine, etc.

The 2-naphthol-6.8-disulfonic acid may be replaced by other naphthol sulfonic acid compounds, for example: 2-naphthol-6-sulfonic acid, 1-naphthol-4-sulfonic acid, 2-naphthol-8-acid, 1-naphthol-3.6-disulfonic acid, 1-naphthol-4-8-disulfonic acid, 2-naphthol-3.6-disulfonic acid, 2-naphthol-3.6.8 trisulfonic acid, 1 naphthol-3.6.8-trisulfonic acid, 1-naphthol-5-sulfonic acid, 1-naphthol-3.81-disulfonic acid, 1-naphthol-4.7-disulfonic acid, 1.8-dihydroxynaphthalene-3.6-disulfonic acid, 1.8-dihydroxy-naphthalene-4-sulfonic acid, 8-chlor-1-naphthol-3.6-disulfonic acid, 8-chlor-1-naphthol-5-sulfonic acid, 1.7-dihydroxy-2-naphthoic-4-sulfonic acid, 1.7-dihydroxy-6-naphthoic-3-sulfonic acid, etc.

Since changes in the invention above described may be made without departing from its scope, the above description is to be construed as illustrating rather than limiting the invention. It is also to be understood that the following claims are intended to cover the generic and specific features of the invention herein disclosed, and all statements of the scope of the invention which as a matter of language, might be said to fall therebetween.

I claim:

1. In the production of azo dyes by a process which comprises diazotizing an aminoazoaryl compound which belongs to the class having the following general formula $$X-R-N=N-R'-NH_2$$

wherein R and R' represent like or unlike aryl residues of the benzene or naphthalene series, and X represents a hydrogen atom or an arylazo residue of the benzene or naphthalene series, and coupling the resulting diazo compound with a naphthol sulfonic acid compound which is free from an amino group, the improvement which comprises carrying out the coupling in a reaction medium comprising a heterocyclic tertiary nitrogenous base.

2. In the production of azo dyes by a process which comprises diazotizing an aminomonazoaryl compound which belongs to the class having the following general formula $$R''-N=N-R'-NH_2$$

wherein R'' and R' represent like or unlike aryl residues of the benzene of naphthalene series, and coupling the resulting diazo compound with a naphthol sulfonic acid compound, the improvement which comprises carrying out the coupling in a reaction medium comprising a heterocyclic tertiary nitrogenous base.

3. In the production of azo dyes by a process which comprises diazotizing an aminoazoaryl compound comprised within the following general formula $$X-R-N=N-P'-NH_2$$

wherein P' represents an aryl residue of the benzene series, R represents an aryl residue of the benzene or naphthalene series, and X represents a hydrogen atom, or an arylazo residue of the benzene or naphthalene series, and coupling the resulting diazo compound with a naphthol sulfonic acid compound which is free from an amino group, the improvement which comprises carrying out the coupling in a reaction medium comprising a heterocyclic tertiary nitrogenous base.

4. In the production of azo dyes by a process which comprises diazotizing an aminophenylazophenyl compound comprised within the following general formula $$X-P-N=N-P'-NH_2$$

wherein P and P' represent like or unlike aryl residues of the benzene series, and X represents a hydrogen atom or an arylazo residue of the benzene or naphthalene series, and coupling the resulting diazo compound with a naphthol sulfonic acid compound which is free from an amino group, the improvement which comprises carrying out the coupling in a reaction medium comprising a heterocyclic tertiary nitrogenous base.

5. In the production of azo dyes by a process which comprises diazotizing an aminoazoaryl compound which belongs to the class having the following general formula $$X-R-N=N-R'-NH_2$$

wherein R and R' represent like or unlike aryl residues of the benzene or naphthalene series, and X represents a hydrogen atom or an arylazo residue of the benzene or naphthalene series, and coupling the resulting diazo compound with a naphthol-disulfonic acid compound which is free from an amino group, the improvement which comprises carrying out the coupling in a reaction medium comprising a water soluble heterocyclic tertiary nitrogenous base.

6. In the production of azo dyes by a process which comprises diazotizing an aminoazoaryl compound comprised within the following general formula

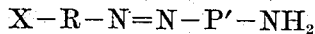

wherein P' represents an aryl residue of the benzene series, R represents an aryl residue of the benzene or naphthalene series, and X represents a hydrogen atom, or an arylazo residue of the benzene or naphthalene series, and coupling the resulting diazo compound with a naphthol disulfonic acid compound which is free from an amino group, the improvement which comprises carrying out the coupling in a reaction medium comprising a water soluble heterocyclic tertiary nitrogenous base.

7. In the production of azo dyes by a process which comprises diazotizing an aminophenylazophenyl compound comprised within the following general formula

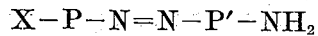

wherein P and P' represent like or unlike aryl residues of the benzene series, and X represents a hydrogen atom or an arylazo residue of the benzene or naphthalene series, and coupling the resulting diazo compound with a naphthol-disulfonic acid compound which is free from an amino group, the improvement which comprises carrying out the coupling in a reaction medium comprising a water soluble heterocyclic tertiary nitrogenous base.

8. In the production of a disazo dye the process which comprises diazotizing an aminomonazobenzene compound and coupling the resulting diazo compound in the presence of pyridine with a naphthol sulfonic acid compound.

9. In the production of a disazo dye the process which comprises diazotizing an aminomonazobenzene compound and coupling the resulting diazo compound in the presence of pyridine with a naphthol sulfonic acid compound which is free from substituents other than the hydroxyl and sulfo groups.

10. In the production of a disazo dye the process which comprises diazotizing an aminomonazobenzene compound and coupling the resulting diazo compound in the presence of pyridine with a naphthol-disulfonic acid which is free from substituents other than the hydroxyl and sulfo groups.

11. In the production of a disazo dye the process which comprises diazotizing aminoazobenzene and coupling the resulting diazo compound in the presence of pyridine with 2-naphthol-6.8-disulfonic acid.

12. In the production of a disazo dye the process which comprises diazotizing an aminomonazobenzene compound and coupling the resulting diazo compound with a naphthol sulfonic acid compound in an alkaline coupling medium comprising a heterocyclic tertiary nitrogenous base.

13. In the production of a disazo dye the process which comprises diazotizing an aminomonazobenzene compound and coupling the resulting diazo compound with a naphthol sulfonic acid compound which is free from substituents other than the hydroxyl and sulfo groups, in an alkaline coupling medium comprising a water-soluble heterocyclic tertiary nitrogeneous base and sodium carbonate.

14. In the production of a disazo dye the process which comprises diazotizing an aminomonazobenzene compound and coupling the resulting diazo compound with a naphthol disulfonic acid compound which is free from substituents other than the hydroxyl and sulfo groups, in an alkaline coupling medium comprising a water-soluble heterocyclic tertiary nitrogeneous base and sodium carbonate.

15. In the production of a disazo dye the process which comprises diazotizing aminoazobenzene and coupling the resulting diazo compound with a naphthol sulfonic acid compound in an alkaline coupling medium comprising pyridine and sodium carbonate.

16. In the production of a disazo dye the process which comprises diazotizing aminoazobenzene and coupling the resulting diazo compound with a naphthol sulfonic acid compound in a coupling medium which contains about 0.7 mols of pyridine and about 3.1 mols of sodium carbonate per mol of diazotized aminoazobenzene.

17. In the production of azo dyes, the process which comprises diazotizing an aminoazoaryl compound which belongs to the class having the following general formula

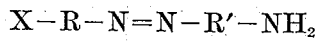

wherein R and R' represent like or unlike residues of the naphthalene series each of which may contain a sulfo group as a substituent, and X represents a hydrogen atom or an aryl residue of the benzene or naphthalene series, and coupling the resulting diazo compound in the presence of pyridine with a naphthol-sulfonic acid compound which is free from substituents other than the hydroxyl and sulfo groups.

18. In the production of azo dyes, the process which comprises diazotizing an aminobenzene-azo-sulfonaphthalene-azo-sulfoalphanaphthylamine and coupling the resulting diazo compound in the presence of pyridine with 2-naphthol-6-sulfonic acid.

19. In the production of azo dyes, the process which comprises diazotizing oxalyl-p-aminophenyl-azo-6-sulfonaphthalene-azo-6-sulfo-1-naphthylamine, and coupling the resulting diazo compound with 2-naphthol-6-sulfonic acid in an alkaline coupling medium comprising pyridine and sodium carbonate.

In witness whereof I have hereunto set my hand.

JAMES P. PENNY.

CERTIFICATE OF CORRECTION.

Patent No. 1,897,211.  February 14, 1933.

JAMES P. PENNY.

It is hereby certified that error appears in the printed specification of the above numbered patent requiring correction as follows: Page 2, line 37, for "diazo" read "disazo", and line 43, for "200" read "2000"; page 3, line 17, for "2-hydroxy13.5-dinitro-" read "2-hydroxy-3.5-dinitro-"; line 36, for "4-8" read "4.8"; line 40, for "3.81" read "3.8"; and line 84, claim 2, for "of" second occurrence read "or"; and that the said Letters Patent should be read with these corrections therein that the same may conform to the record of the case in the Patent Office.

Signed and sealed this 9th day of May, A. D. 1933.

(Seal)

Acting Commissioner of Patents.
M. J. Moore.